UNITED STATES PATENT OFFICE 2,175,490

ALKALINE EARTH METAL SOAP AND METHOD OF MAKING THE SAME

Frederick A. Stresen-Reuter and Charles Rimpila, Chicago, Ill., assignors to Fred'k A. Stresen-Reuter, Inc., a corporation of Illinois No Drawing. Application February 26, 1938, Serial No. 192,883

8 Claims. (Cl. 87—16)

This invention relates to soap and soap manufacture and more particularly to water-insoluble alkaline earth metal soaps and to methods of making the same.

This application is related to the copending application Serial No. 192,884, filed February 26, 1938.

In accordance with our invention we have found that novel water-insoluble soaps such as the alkaline earth metal soaps can be formed from an organic acid containing liquor obtained from wood as a by-product in the manufacture of paper, such as that sold in the trade under the trade-mark "Spefa". This liquor is characterized by the presence of a major proportion by weight of unsaturated fatty acids calculated as oleic, linoleic, and linolenic, a minor proportion by weight of rosin acids or acids calculated as rosin acids and a relatively small proportion of unsaponifiables, (mainly sterols). A suitable liquor called "Spefa" employed in accordance with our invention has a specific gravity (at 15.5° C.) of about .969; an acid number of about 164.0; a saponification number of about 173.0; an ester number of about 9.4; an iodine number (Wijs) of about 148.0; and a thiocyanogen-iodine number of about 91.0, and is a refined mixture of fatty acids, rosin acids and sterols derived from the liquor from the sulfate process treatment of woods such as pine.

A typical analysis of this liquor is as follows. In the following analysis and in all examples hereinafter set forth, the term "parts" indicates parts by weight.

| | Parts (approximate) |
|---|---|
| Fatty acid calculated as linolenic acid | 19.25 |
| Fatty acid calculated as linoleic acid | 10.50 |
| Fatty acid calculated as oleic acid | 23.04 |
| Rosin acids (or acids calculated as rosin acids) | 39.20 |
| Unsaponifiables, largely sterols | 8.01 |

In preparing alkaline earth metal soaps from the liquor used in accordance with our invention, the liquor may be first boiled in a suitable vessel with any suitable alkaline solution such as, for example, with aqueous caustic soda or potash, or with an organic amine compound such as triethanolamine, to form a water-soluble soap solution. The soap solution so formed may then be diluted, suitably to about 20% solids in the case of sodium or potassium soaps, and to about 10% solids in the case of the triethanolamine soap and the solution maintained at about 200° F. while the required amount of the alkaline earth metal compound is added. The alkaline earth metal soap is then formed by double decomposition and precipitates to the bottom of the vessel. The precipitated water-insoluble soap is then separated in any desirable manner, washed with warm water and then air dried.

The alkaline earth metal soaps embodying our invention may also be prepared by directly fusing the liquor with compounds of the desired alkaline earth metal such as the oxides or hydroxides of the desired metals. Thus, in accordance with our invention, the liquor may be heated to a suitably high temperature and the oxide or hydrate of the desired alkaline earth metal slowly added. The mixture is held at the elevated temperature until the reaction is complete, as indicated by the formation of a clear pill when a small amount of the reaction product is dropped onto a glass slide.

In general, equivalent or stoichiometrical or other desirable amounts of the reactants are employed to produce the water-insoluble alkaline earth metal soap embodying our invention. In carrying out the processes embodying our invention we have produced, for example, the water-insoluble calcium, barium, magnesium and like alkaline earth metal soaps.

The following examples illustrate the methods employed in accordance with our invention to produce our novel water-insoluble alkaline earth metal soaps. It is, of course, to be understood that the water-insoluble soaps produced in accordance with the following examples are merely illustrative of the soaps embodying our invention since our invention comprehends the class of the water-insoluble alkaline earth metal soaps of the acids set forth above.

EXAMPLE 1

Part I 100 parts of the liquor "Spefa" are mixed with 100 parts of water and 12.38 parts of sodium hydroxide in a suitable vessel. The mixture is boiled until the resulting water-soluble soap solution has a pH of about 8 to 9; the time of reaction being about three hours. The soap solution so formed is now diluted, suitably to about 20% solids content.

Part II

The water-soluble soap solution produced in accordance with Part I is then mixed with 17.41 parts of calcium chloride in aqueous solution (about 20% solids) at about 200° F. The water-insoluble calcium soap is formed by double decomposition and precipitates to the bottom of the vessel. The precipitated calcium soap is washed several times with warm water as by stirring and decanting to remove any impurities therefrom. The soap is removed from the bottom of the vessel and then air-dried.

EXAMPLE 2

A water-soluble soap is formed as described in Part I of Example 1 and to this soap is added 18.91 parts of magnesium sulphate in aqueous solution (about 20% solids) to form the water-insoluble magnesium soap, all as fully described in Part II of Example 1.

EXAMPLE 3

The water-insoluble barium soap is formed in the same manner as the water-insoluble calcium soap described in Example 1 except that about 32.8 parts of barium chloride in aqueous solution (about 20% solids) is used to precipitate a water insoluble barium soap.

The water-insoluble alkaline earth metal soaps embodying our invention may have, if desired, an unusually high metal content which closely approximates theoretical. Using the wood fatty acids such as the liquor "Spefa" in accordance with our invention, it is possible to obtain almost the equivalent or stoichiometrical amount of metal in the soap.

The water-insoluble alkaline earth metal soaps embodying our invention are readily soluble in suitable vehicles or solvents such as, for example, the light petroleum distillates including heavy naphtha, kerosene, V. M. and P. naphtha, and the petroleum naphtha thinner sold in the trade under the trademark "Apco"; paraffin oils, and the like; or in raw or bodied vegetable drying or semi-drying oils such as, for example, linseed, perilla, China wood oil, soy bean, oiticica, and the like; and in animal oils such as fish oils and the like. The solutions formed are homogeneous and stable, and the water-insoluble soap will not, in general, settle out from the vehicle even when the solution is cooled to below room temperature. The water-insoluble soaps embodying our invention will not oxidize when in solution.

The calcium, barium, magnesium and like alkaline earth metal soaps embodying our invention are relatively odorless and are readily soluble in petroleum thinners, paraffin oils, and the like. In concentrations of about 10 to about 50% and higher in the solution, these soaps serve to body the oils to meet any desired needs in oil lubricants and greases. With about 20 parts of the calcium soap dissolved in about 80 parts of heavy naphtha or paraffin oil (100/100 viscosity), the solutions formed are stable gels at room temperature which are admirably suitable for use as greases. With about 20 to 50 parts of the barium soap in 50 to 80 parts of the same solvents, the solutions are similarly stable gels in character. The alkaline earth soaps made from linseed oil and the like, rosin acids or mixtures thereof as in the prior art are not readily soluble in petroleum thinners and paraffin oil and are not, in general, capable of forming stable gels. The alkaline earth metal soaps, in relatively small amounts, appear to possess wetting and dispersing characteristics in paints and varnishes and, in consequence, increase the spread and flow thereof.

In accordance with our invention we have also produced excellent water-insoluble soaps by reacting alkaline earth metal compounds with the liquor "Spefa" which has been freed from all unsaponifiable materials as, for example, by washing the water-soluble soap of "Spefa" with petroleum ether. We have prepared also excellent water-insoluble alkaline earth soaps by the aid of synthetic preparations of acids, either with or without saponifiables such as sterol compounds which closely approximate the acids, in character and in amount, present in the liquor "Spefa". Thus, we have obtained satisfactory soaps by reacting, in the manner described above, alkaline earth metal compounds with a mixture of acids, the major proportion of which is unsaturated fatty acids and the minor proportion of which is rosin or rosin acids and the like. The synthetic acid mixture used in accordance with our invention may, if desired, contain a small proportion of sterol and/or sterol compounds or like unsaponifiable materials.

Wood organic acid mixtures similar to "Spefa" such as "Indusoil", "Liqro" may be used in lieu of the "Spefa" in accordance with our invention.

We claim:

1. A water-insoluble soap comprising the reaction product of an alkaline earth metal compound and a mixture comprising a major proportion of unsaturated fatty acids, a minor proportion of rosin acids and a small proportion of a sterol.

2. As a new reaction product, a water-insoluble alkaline earth metal soap of a product derived from pine wood comprising a major proportion of unsaturated fatty acids, a minor proportion of rosin acids and a small proportion of an unsaponifiable material calculated as a sterol.

3. As a new reaction product, a water-insoluble calcium soap of a product derived from pine wood comprising a major proportion of unsaturated fatty acids, a minor proportion of rosin acids and a small proportion of an unsaponifiable material calculated as a sterol.

4. As a new reaction product, a water-insoluble magnesium soap of a product derived from pine wood comprising a major proportion of unsaturated fatty acids, a minor proportion of rosin acids and a small proportion of an unsaponifiable material calculated as a sterol.

5. As a new reaction product, a water-insoluble barium soap of a product derived from pine wood comprising a major proportion of unsaturated fatty acids, a minor proportion of rosin acids and a small proportion of an unsaponifiable material calculated as a sterol.

6. A stable solution comprising a solvent vehicle and a water-insoluble alkaline earth metal soap of a product derived from pine wood comprising a major proportion of unsaturated fatty acids, a minor proportion of rosin acids and a small proportion of an unsaponifiable material calculated as a sterol.

7. A stable solution comprising a solvent vehicle and a water-insoluble soap comprising the reaction product of an alkaline earth metal compound and an acid mixture comprising a major proportion of unsaturated fatty acids, a minor proportion of rosin acids and a small proportion of a non-saponifiable material calculated as a sterol.

8. A stable solution comprising a solvent vehicle and a water-insoluble soap comprising the reaction product of an alkaline earth metal compound and an organic acid mixture derived from wood comprising a major proportion of unsaturated fatty acids, a minor proportion of rosin acids and a small proportion of a non-saponifiable material calculated as a sterol.

FREDERICK A. STRESEN-REUTER.
CHARLES RIMPILA.